Feb. 26, 1952     H. BROWN     2,587,106
ROTARY CULTIVATOR
Filed Nov. 22, 1948
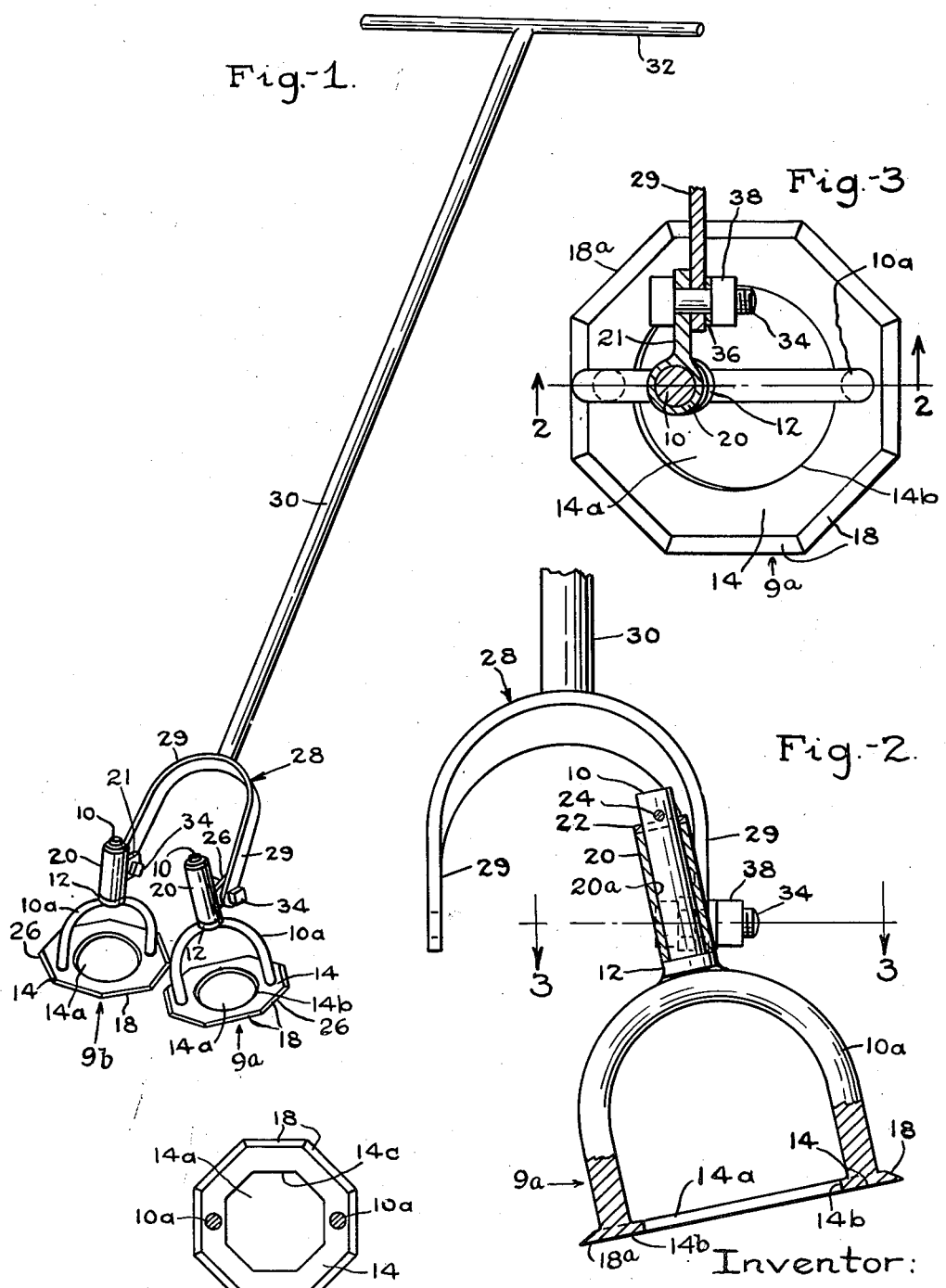

Patented Feb. 26, 1952

2,587,106

UNITED STATES PATENT OFFICE 2,587,106

ROTARY CULTIVATOR

Harrison Brown, Fargo, N. Dak.

Application November 22, 1948, Serial No. 61,383

5 Claims. (Cl. 97—58)

My invention relates to rotary cultivators and has for its purpose to provide one or more members mounted for free rotation and held angularly with respect to each other and with respect to the ground by a means for propelling them over the ground, whereby such propulsion will act to rotate the cultivator members and will effect a thorough disintegration of the soil, removing and destroying weeds, and at the same time leaving the soil not only free from weeds, but thoroughly pulverized and with a comparatively smooth surface.

Rotary cultivators as heretofore employed have been in the form of disks mounted substantially vertically so as to penetrate the soil with the vertically held edges of the disk, or have been solid plate-like members operating upon the ground in a substantially horizontal position of the plate and sometimes having vertical fingers or projections which are supposed to enter the ground. None of these former devices have been effective for giving a complete and thorough disintegration of the soil and destruction of weeds. Many of them have been rotated by power means which does not produce effective results, and those which have been rotated by traction effect as they are moved over the ground have not produced a really satisfactory and complete disintegration of the ground.

I have discovered that by providing a cultivator head, the outer edge of which lies substantially within a circle, although the outer edge may be formed to outline a polygon, such for example as a hexagon or an octagon, forming the head portion with an open center and with its outer edges knife-like in character, with a continuous cutting edge, and mounting the head for free rotation with its bottom face slightly tilted, a highly efficient tool is provided which is self-rotating by being pushed across the ground, which produces a layer of dry pulverized soil over the surface of the ground, and thereby conserves moisture in the moist soil beneath the surface, which eliminates clods, slabs, ruts, furrows and channels, and breaks up both the surface rain crust and moist sub-surface hardpan, and which does not raise and expose the moist soil.

My invention will be most effectively carried out by providing a pushing handle with a fork at its bottom, and mounting two of my rotatable cultivator heads on the fork ends tipped away from each other and spaced so that the rows of plants will come at the sides of them, but other forms of propulsion, as by power, may be used.

These cultivator heads will be tipped toward the row of growing plants and the contact of the soil which engages parts of the cultivator heads both on their outer edges and also within the edges of the opening through them will cause them to rotate as the device is pushed over the ground. That rotation will cause the earth to be lifted and rolled over the soil cultivator head portions and through their openings, and thereafter be engaged by the edges of the opening, to produce remarkably effective and useful soil pulverization.

It is a principal object of my invention, therefore, to provide a form of cultivator head which has a central opening and an annular soil-engaging portion, the outer face of said head being held in a plane at an acute angle to the surface of the ground and having an outer sharp edge whereby when the device is pushed over the ground with the outer edges thereof in contact with the ground, it will dig itself into the ground, cause the soil to be lifted and flowed over the annular plate and up and through its opening and again be contacted by the soil-contacting edge of the opening to simultaneously effect slow rotation of the cultivator head and thorough and complete cultivation of the soil for a considerable distance below its surface.

It is a further object of my invention to mount two cultivator heads upon the ends of a fork or U-piece carried by a populsion member, so that the faces of the cultivator heads will lie in planes rising upwardly from the inner or row sides of the faces of the cultivator heads and will thus be sloped in opposite directions.

It is a further object of my invention to form the cultivator head or heads broadly circular in outline with a circular opening at the center to leave an annular cultivator part about said opening and preferably to form the outer edges of said annular member as a many-sided polygon, such, for example, as an octagon or hexagon. The opening also may be in the form of a polygon.

It is a further object of my invention to connect to the annular portion of the cultivator head a plurality of arms which will unite in a spindle extending outwardly along a line running through the center of the central opening and to form in conjunction with said arms a spindle extension adapted to be mounted in a sleeve member rigidly attached to a fork end of the propulsion member, and said socket member being tilted so as to hold the cultivator head to rotate in a plane at an acute angle to the surface of the ground.

The full objects and advantages of my invention will appear in connection with the following specification and the novel features by which the aforesaid advantageous and important results are obtained will be particularly pointed out in the claims.

In the drawings,

Fig. 1 is a perspective view of my rotary cultivator with one form of propelling means attached thereto.

Fig. 2 is an enlarged sectional elevation view of my rotary cultivator taken on line 2—2 of Fig. 3.

Fig. 3 is a sectional plan view of a portion of my cultivator head, taken on line 3—3 of Fig. 2.

Fig. 4 is a top plan sectional view of one form of cultivator head employed with my rotary cultivator.

The cultivator head which I employ is illustrated generally by the numerals 9a and 9b in the different figures. In the forms shown in Figs. 1, 2 and 3 the cultivator head embodies a post 10 rigidly secured to a U member 10a, which in turn is secured at its inner ends to a cultivator plate 14. The cultivator plate has an outer edge 18, all parts of which lie within a bounding circle. Preferably I form this outer edge 18 as an octagon, although other polygons such as hexagons, pentagons and the like may be employed, and also for some purposes a true circle may form the outer edge.

The edge 18 is preferably bevelled downwardly to a substantially sharp edge 18a, as best shown in Fig. 2. Within the cultivator plate 14 is formed an opening 14a, which is circular in the forms of Figs. 1, 2 and 3, providing an inner edge 14b and which is octagonal, as indicated at 14c in Fig. 4.

The post 10 is mounted within a cylindrical bearing member 20. This bearing member 20 is formed integrally with a thin extension 21. This thin extension 21 is removably but rigidly secured to one or the other of the outer arm ends 29 of the U-pieces 28, which is rigidly secured to a pusher bar 30 of a form of pusher mechanism shown in Fig. 1. The upper end of bar 30 is provided with a cross-handlebar 32 as shown in Fig. 1.

It will be understood, however, that other forms of pusher mechanisms may be connected with my cultivator head without departing from the scope and intent of my invention which will operate effectively regardless of the pusher mechanism employed.

As shown in Figs. 1 and 2 the post 10 is cylindrical and fits within the cylindrical opening 20a of the cylinder 20 secured to the U-piece 10a.

The cultivator head is secured in position upon the arm 29 of the U-pieces 28 by means of a bolt 34 which passes through the extension 21 from the side of cylinder 20, as best shown in Fig. 3. The nut 38 takes against a lock washer 36 and rigidly secures the cylinder 20 and the cultivator head carried thereby to the arm 29.

It will be obvious that this means of securing makes it practical to adjust the position of the plate 14 forwardly or backwardly relative to the ground over which it is used. However, the cylinder 20 extends at an angle to the securing extension 21 so that the plate 14 will always be tipped outwardly from the perpendicular at an acute angle to the ground, but by the nut and bolt connection above described, may also be tipped out of the horizontal forward or back as conditions require.

In any form of the invention the ground-engaging plate 14 will in effect be an annular plate surrounding the openings 14a, which is a highly important feature of my invention.

As shown in Fig. 1, the U-piece 28 has a cultivator head 9a attached to each of the arms 29 of said U-pieces in the manner above described. The planes of the outer faces 14b of the annular cultivator plates 14 always are presented to the ground at an acute angle. These two cultivator heads are tipped at an angle away from each other and operate so as to leave spaces 26 at their sides which will mark lines of the rows of plants which in pairs are cultivated.

As the rotary cultivator is pushed over the ground by means of the propelling apparatus shown and indicated by numerals 30, 32 and 28, or by any suitable propelling means, the annular plates 14 will engage the soil both with the outer sharp edges 18a and the inner edges 14b surrounding the openings 14a. This progressive engagement will, first, break the soil crust. Second, through contact of outer edges 18a and inner edges 14b and of the annular faces 14b, of the cultivating plates 14, it will not only work the soil over and leave it in a thoroughly disintegrated but level state, but will act upon the edges 18a and 14b of the cultivator annular plate 14 to cause it to be slowly rotated, progressively putting a crushing and levelling and upwardly rolling action upon the upper layers of earth as the rotary cultivator passes over them, and this action may go deeper to the extent of breaking into and disintegrating any hardpan formed near the surface of the ground.

The results of this action is to destroy weeds, even seeds that have started to grow, or are in the seed germination state, and to leave a substantially level, finely disintegrated layer of soil on the top of the ground to insulate the moisture in the parts of the soil below that layer from evaporation and loss.

The inner surface 14b of the cultivating plates 14 assist in the balance and guidance of the unit when in operation. The conjoint rotary action of the plates 14 is in effect rotation of them in opposite directions, which further assists in the guidance and balance of the unit when operating.

Although true circular edges of the outside and inside of the annular cultivating plates 14 may be employed and are within the scope of my invenition, the polygonal edges (octagonal as shown) penetrating the soil are most effective in securing rotation and breaking and mulching of the soil. The comparatively narrow surfaces of the annular soil-engaging portions of the cultivating plates 14, constantly being caused to rotate, permit free scouring so those surfaces are not clogged by their action upon and through the soil.

In effect the edges 14b of openings 14a provide for a second working of the soil even when the cultivating plates 14 are operated without being tipped forwardly or rearwardly. When the plates are tipped either forward or rearwardly not only do the outside edges 18a, which are preferably sharp edges, cut through the soil at a considerable depth, but the inside edges 18b or 14c of the opening 14a cuts into and works the soil at a different level from that of the soil level which is cut by the outer edge 18a of the cultivating annular plates.

These openings 14a, whether the outer edges thereof are circular or octagonal, have the effect of preventing an accumulation of soil which would take place with solid cultivating disks, that is cultivating disks with no openings. The rotation of a solid or unperforated disk of the type of my cultivating plate 14, would cause soil to accumulate upon the bottom of the solid disk and would result in an accumulation around the pins supporting said disk.

The openings 14a in my cultivator annular plates make the entire cultivating plates operate quite differently from that of a cultivator plate or disk which has no central opening. My plates in operation permit sufficient but not excessive penetration of the soil by the application of downward pressure, where, as in loose and sandy soil, tilting might cause excessive penetration.

In the operation of my device the openings 14a permit most of the soil which is cut and raised by the edge 18a to be lifted and pass over the cultivating annular plate 14 and thus to be worked over a second time by the bounding edges of the openings 14a.

These are all important advantages differing from what has come before, which make my rotary cultivator in effect a new device unlike any rotary cultivator heretofore employed.

I claim:

1. A rotary cultivator, comprising a cultivator head plate formed with a central opening and having an outer edge falling substantially within a circle and of a dimension to provide an annular cultivating face about the central opening, a propelling member having a part forming a connection with the cultivator head plate, said connection including a pin secured to the cutter head and a sleeve fast on the connection within which the pin is adapted to rotate the pin within the sleeve connection being inclined from vertical so the cultivator head plate is held at an angle of less than 90 degrees to the surface of the ground, whereby movement of the cultivator over and in contact with the ground will cause the cultivator head plate to be rotated and the ground to be cultivated.

2. A rotary cultivator, comprising a cultivator head plate formed with a central opening and having an outer edge falling substantially within a circle and of a dimension to provide an annular cultivating face about the central opening, a propelling member having a part forming a connection with the cultivator head plate, said connection including a pin secured to the cutter head and a sleeve fast on the connection within which the pin is adapted to rotate, the pin and sleeve connection being such that the face is in a plane at an acute angle to the surface of the ground, whereby movement of the cultivator over and in contact with the ground will cause the cultivator head plate to be rotated, and the ground to be cultivated.

3. A rotary cultivator, comprising a pair of cultivator head plates each formed with a central opening, each having a side edge falling substantially within a circle and of a dimension to provide an annular cultivating face about the central opening, a propelling member having a pair of parts, each one of said pair forming a connection with one of the cultivator head plates, said each connection including a pin secured to the cutter head and a sleeve fast on the connection within which each of the respective pins is adapted to rotate, the respective sleeves extending in opposite directions from between pairs of plant rows when the machine is in operation at acute angles to the ground, whereby movement of the cultivator over and in contact with the ground will cause the respective cultivator head plates to be rotated and the ground to be cultivated.

4. A rotary cultivator, comprising a propelling bar, a U-piece rigidly attached at its center to said bar and having arms extending from a point of attachment substantially in parallel relation, cylindrical members removably and adjustably attached each to an end of said arms, said attachment being such that the openings through the respective cylinders are tipped towards each other, cultivator head plates each formed with a central opening and having an outer edge falling substantially within a circle and of a dimension to provide an annular cultivating face about the central opening, and a pin rigidly attached to each cultivator head plate and journaled within the opening through the respective cylinders to rotatably hold the head plates with their faces at an angle to each other and to the ground, whereby movement of the cultivator head plate over and in contact with the ground will cause the cultivator head to be rotated and the ground to be cultivated.

5. A rotary cultivator, comprising a cultivator head plate formed with a central opening and having an outer edge which is substantially octagonal and of a dimension to provide an annular cultivating face about the central opening, a pin, an arched member rigidly connected with the pin and with the upper face of the cultivator head plate to leave a free space above said opening, a propelling bar, a sleeve member removably and adjustably attached to the propelling bar, said pin being journaled within the sleeve to rotatably hold the face of the head plate at an angle to the surface of the ground, whereby movement of the cultivator over and in contact with the ground will cause the respective cutter heads to be rotated and the ground to be cultivated.

HARRISON BROWN.

REFERENCES CITED

The following references are of record in the file of this patent:

UNITED STATES PATENTS

| Number | Name | Date |
|---|---|---|
| 368,082 | Featherston | Aug. 9, 1887 |
| 409,818 | Bell | Aug. 27, 1889 |
| 1,940,129 | Howe et al. | Dec. 19, 1933 |
| 2,132,300 | Johnson | Oct. 4, 1938 |
| 2,205,188 | Cuddigan et al. | June 18, 1940 |

FOREIGN PATENTS

| Number | Country | Date |
|---|---|---|
| 11 779 | Great Britain | July 3, 1847 |